(No Model.)
D. H. BURRELL.
DAIRY VAT.
No. 252,574. Patented Jan. 17, 1882.
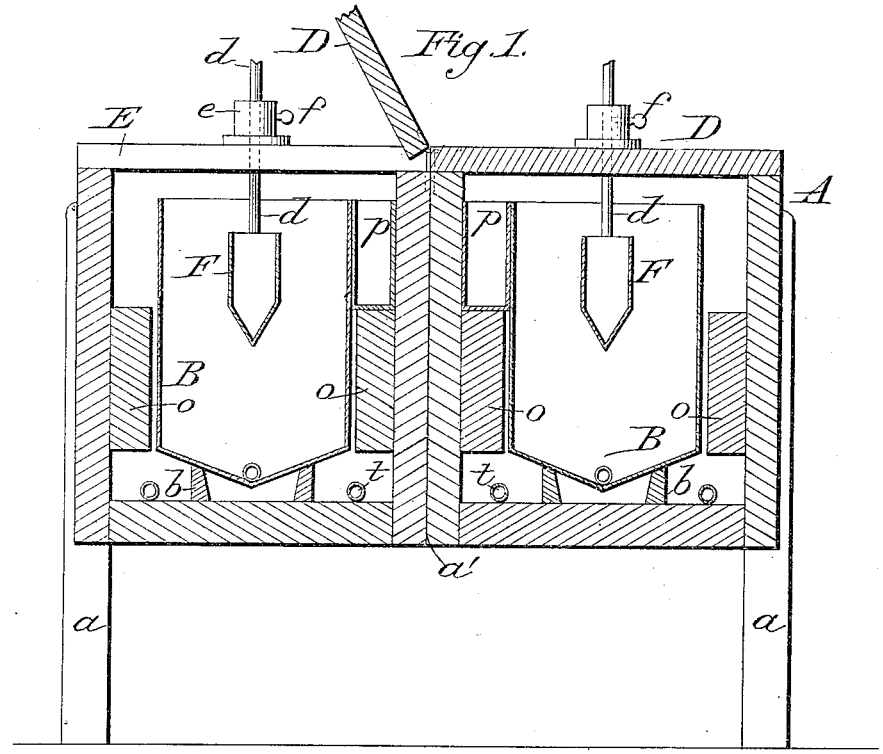
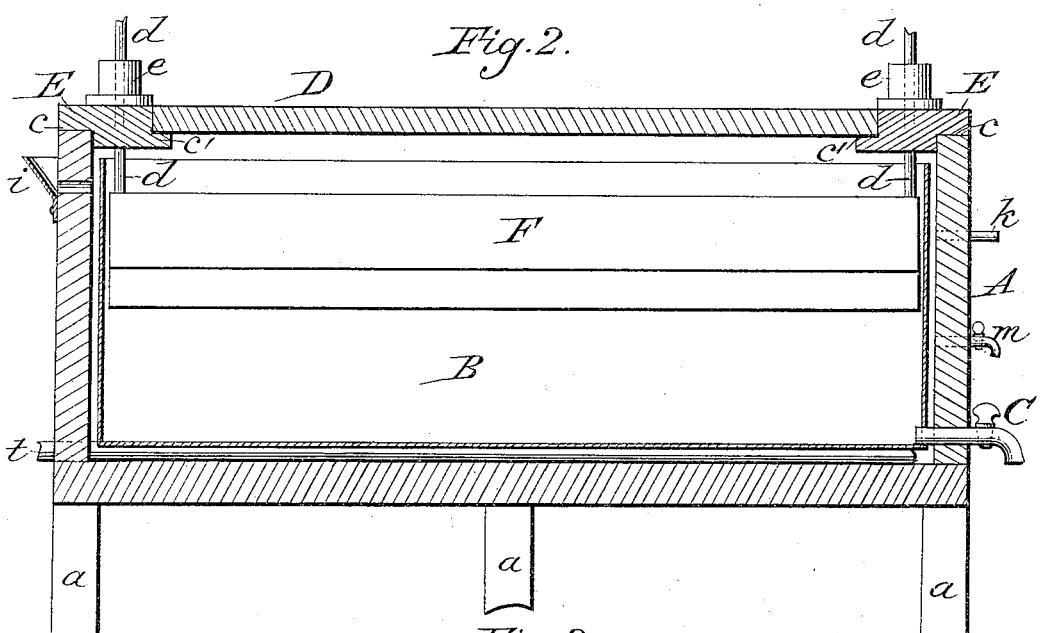
Attest:
F. H. Schott
A. R. Brown
Inventor:
David H. Burrell
per J C Tasker
atty

UNITED STATES PATENT OFFICE.

DAVID H. BURRELL, OF LITTLE FALLS, NEW YORK.

DAIRY-VAT.

SPECIFICATION forming part of Letters Patent No. 252,574, dated January 17, 1882.

Application filed August 25, 1881. (No model.)

*To all whom it may concern:*

Be it known that I, DAVID H. BURRELL, of Little Falls, in the county of Herkimer and State of New York, have invented certain new and useful Improvements in Dairy-Vats; and I do hereby declare that the following is a full, clear, and exact description of the invention, which will enable others skilled in the art to which it appertains to make and use the same, reference being had to the accompanying drawings, which form a part of this specification.

My invention relates to creamery-vats or apparatus for treating milk for the purpose of rapidly and economically raising cream in the manufacture of butter; and it consists in certain novel features of construction, as hereinafter more fully described and claimed.

In the annexed drawings, Figure 1 is a vertical transverse section of a double or twin vat adapted for applying heat below the milk-pans and cold at the upper parts thereof, whereby the raising of cream is greatly facilitated. Fig. 2 is a vertical longitudinal section of the same; and Fig. 3 is a perspective view of an open-top conduit or ice-receptacle adapted to be suspended within a milk-vessel.

Like letters indicate like parts in the several views.

The outer vat or casing, A, is supported on legs *a a*, and is preferably divided longitudinally by one or more vertical partitions, *a'*, so as to form two or more compartments for the reception of the milk-pans B. In practice I find that two removable milk-pans or inner vats arranged within the outer vat are preferable, it being convenient to employ one of said inner vats or pans for treating the morning's milk, while the other vat or pan is reserved for the milk drawn in the evening. One pan may also be used for heating purposes at the same time that the milk in the other pan is being cooled.

The milk-pans B are made with bottoms inclining downward from each side to a central longitudinal depression, and may rest, if desired, on cleats *b b* at the bottom of the vat, or may be suspended therein by any convenient means. At one end of each milk-pan, in line with its central longitudinal depression, and therefore at its lowest point, is an opening which is coincident in position and connects with a faucet, C, that passes through the end of the outer vat.

The vat A is provided with close-fitting covers D D, which may be made in sections, if desired, so that the contents of the milk-pans may be inspected without too great exposure to the atmosphere. These covers need not extend quite to the ends of the vat, the remaining space at each end being covered by the cross-pieces E E. The cross-pieces are provided with flanges or rabbets *c c* on the outer side and at each end, which flanges rest on the top of the outer vat. They also have on the inner side a short flange or rabbet, *c'*, that assists in supporting the cover D, and closes the joint between it and the cross-piece. If desired, the covers, when made in sections, may also be flanged or rabbeted at their edges or points of contact the more effectually to close their joints and exclude the atmosphere. Any suitable packing may also be attached to the covers for a similar purpose.

Within the milk-pan is suspended an open-top conduit or ice-receptacle, F, which may be rendered adjustable, if desired, by means of vertical rods or pipes *d d*, attached to its ends and passing upward through perforations in the cross-pieces E E, and also through caps *e e*, which are attached to the upper surfaces of the cross-pieces, and provided with thumb-screws *f*, by which the tubes or rods *d* may be secured so as to support the conduit or ice-receptacle at any required elevation within the milk-pan. By means of these conduits any suitable heating or cooling medium may be readily introduced within the milk pans to regulate the temperature of their contents during the manufacture of butter and cheese.

It will be observed that the open-top conduits or troughs F are vertically elongated and so placed as to project downward in the center of the milk-vessel. They are also preferably made to extend longitudinally within and nearly from end to end of the milk-pans, space being afforded beneath and at the sides and ends of the trough or conduit, so that the milk will be brought in contact therewith on all sides except at the open top. These conduits or troughs are preferably constructed of tin or sheet metal, and are braced by cross-pieces *g g*, or in any suitable manner. When designed for the passage of water they are provided at each end, near the top, with horizontal tubes *h h*, which are arranged to permit the entrance and escape of water without liability of its overflow into the milk-pan. These tubes also serve as journals for the conduit, by means of which it may be suspended within the milk-pan, the tubes in this case passing through notches or openings in the ends of the outer vat, beneath the covers or cross-pieces. The overflow through either tube *h* may be directed into a funnel, *i*, attached on the outside of the vat, at one end, whence it passes through a suitable opening into the outer vat and circulates in the space between the outer and inner vats, for the purpose of continuing and increasing the effect already partially produced by its circulation through the conduit or trough. While the trough or open-top conduit F is thus adapted to be suspended in one position or adjusted vertically within the vat, as desired, and may be employed either as a water-conduit or ice-receptacle, its use for the latter purpose is deemed preferable.

By suspending open-top ice-receptacles within the milk-pans and closing the covers of the outer vat the milk is not only cooled by contact with the sides of the suspended trough, but the air remaining in the space above the milk is also rapidly cooled, and by contact with the surface of the milk assists greatly in reducing its temperature. This manner of cooling the milk also effects considerable economy in the quantity of ice required, the milk being cooled more rapidly and with a less expenditure of ice than required by means heretofore employed.

The walls of the suspended ice-receptacles may be vertical, rounded, or wholly or partially inclined, the latter construction, or a partial inclination inward, as shown in Fig. 1, being preferable as affording a greater surface for contact with the milk in a given space.

Near the upper portion of the outer vat, at one or both ends, are outlet-tubes *k k*, through which the excess of water is enabled to escape, and may be conducted to any desired point. Small faucets *m m* are also arranged in the end of the vat A, on a line with the milk-faucet C, at or near the bottom of the vat, and also at different elevations above, so that the water in the outer vat can be entirely withdrawn when desired, or prevented from rising above any required point. A constant supply of water can thus be passed through the vat and maintained at any desired height therein without diminishing the quantity delivered to the vat. In this way a more uniform temperature is maintained within the vat, as the water employed for heating or cooling the contents of the milk-pans does not remain in the vat long enough to undergo any appreciable change in temperature.

On the inner sides of the outer vat, A, are formed shoulders or projecting shelves *o o*, which support oblong troughs or ice-receptacles *p p*, that rest in the space above said shoulders between the inner and outer vats and afford additional means of conveniently applying cold at the top of the milk-pans.

The milk-vessels B, although in direct contact with the ice-troughs *p p*, do not quite touch the shoulders or shelves *o o*, a sufficient space being left between the shoulders and milk-vessels for the passage downward of drip from the troughs *p p* on the outer sides of said vessels.

If desired, the troughs *p p* may be dispensed with and the ice placed directly upon the shelves or shoulders *o o*, the use of the troughs being deemed preferable, however, for convenience in placing and removing the ice, as well as for avoiding liability of injury from its direct contact with the walls of the milk-vessels.

The milk-vessels B B are arranged in the outer vat so as to leave a space below said vessels. In this space, which also extends beneath the shoulders *o o*, I arrange steam-pipes *t t*, by which the water contained in the outer vat may be rapidly raised to any desired temperature.

Before placing the milk-vessels in position the outer vat is partially filled with water, or water may be introduced through a suitable opening without removing the milk-vessels. The cooling medium being applied to the upper part of the milk-vessel by introducing cold water or ice to the open-top troughs within and on each side of the same, the milk is first cooled at the top, and by the descent of the cooled milk a current is created in the vessel, the warmer milk at the bottom rising to take the place of that previously cooled. This effect is greatly increased and the raising of the cream more thoroughly and rapidly completed by simultaneously heating the water in the space beneath the milk-vessel. The steam-pipes *t*, before referred to, afford a convenient means of applying heat for this purpose. As the milk containing the cream globules or sacks comes to the bottom of the vessel, the heat will expand the globules, and as the cream or butter globules are more susceptible to the influence of heat, they will expand before the more watery parts of the milk, thus rising by their increased lightness and with great rapidity to the surface of the milk.

By means of the vertically-elongated open-top troughs F within the milk-pans, and the cooling troughs or spaces on each side of the upper parts thereof, cold may be readily applied not only to the top of the milk-vessels and their contents, but also for a considerable distance below the cream-line at the center and sides of each vessel.

It will also be observed that the central vertically-adjustable trough F may be arranged so as to remain at or just below the top of the milk-vessel, or may project downward and into the same to any convenient distance, according to the quantity of milk contained in the vessel. All odors and vapors from the milk will be carried into the open troughs at the top and sides of the milk-vessel and be condensed upon the ice or in the cold water, so that the covers may be closed, if desired, immediately after the milk is put into the vessel, thus excluding the outer atmosphere, which would otherwise consume the ice. Hence all the cold is utilized with but a slight expenditure of ice.

This method of applying heat to the bottom of the milk-vessel at the same time that cold is applied at the top enables me to produce a more rapid and thorough separation of the cream than has been hitherto attained. The quantity of good butter obtained from cream raised in this manner has been found by actual experiment to greatly exceed that possible, even under the most favorable circumstances, with methods heretofore practiced. With one hundred pounds of milk the ordinary average of two and one-half pounds of butter is increased without difficulty to an average of four pounds and a half of butter, and this without the expenditure of any unusual or excessive quantity of ice in raising the cream.

Having thus described my invention, what I claim as new, and desire to secure by Letters Patent, is—

1. The herein-described method of treating milk for raising cream, consisting in simultaneously applying heat beneath the milk-vessel and cold at the top of the contents of said vessel, whereby the cream or butter globules brought to the bottom of the vessel by the currents thus created therein are caused to expand and rapidly rise to the surface, substantially as specified.

2. In a milk-cooling apparatus, the combination, with a milk-vessel, of an open-top trough or conduit, suspended in substantially the upper half of the volume of milk contained in the vat, substantially as and for the purpose set forth.

3. In a milk-cooling apparatus, the combination, with a milk-vessel, of an open vertically-elongated trough or conduit extending longitudinally from end to end of the milk-vessel, and suspended therein with the top of the trough below the top of the milk-vat, substantially as shown and described.

4. In a milk-setting apparatus, the combination of an outer vat, a milk-vessel arranged therein, an open-top trough suspended in said vessel, and a cover placed over the outer vat, substantially as and for the purpose described.

5. In a milk-setting apparatus, the combination, with the outer vat, A, having covers D, and perforated cross-pieces E, provided with caps e, of the milk-pans B, and the troughs or conduits F, provided with rods or tubes d d, said troughs being suspended within the milk-vessels and vertically adjustable therein by means of the engagement of the rods or tubes d with the caps e and thumb-screws f, substantially as shown and described.

6. In a milk-setting apparatus, the combination, with the covered vat A and open milk-pan B, placed therein, of the open-top trough or conduit F, suspended longitudinally within the milk-vessel, and the open-top troughs or ice receptacle p p, arranged longitudinally on each side of said vessel at its upper part, substantially as and for the purpose described.

7. In a creamery or milk-cooling apparatus, the combination, with the outer vat, A, and milk-vessel B, of the suspended trough or conduit F, arranged within the milk-vessel, open-top troughs or ice-receptacles p p, resting in contact with the upper part of the milk-vessel, steam-pipes t t, arranged in the open space beneath the milk-vessel, and cover D, adapted to close the outer vat, substantially as shown and described.

In testimony that I claim the foregoing as my own I have hereto affixed my signature in presence of two witnesses.

DAVID H. BURRELL.

Witnesses:
S. B. POMEROY,
MERRICK FREEMAN.